(12) United States Patent
Lilley

(10) Patent No.: US 6,913,431 B2
(45) Date of Patent: Jul. 5, 2005

(54) CONTAINER UNLOADING APPARATUS

(75) Inventor: Mark W. Lilley, Scarborough, ME (US)

(73) Assignee: Southworth Products Corporation, Falmouth, ME (US)

( * ) Notice: Subject to any disclaimer, the term of this patent is extended or adjusted under 35 U.S.C. 154(b) by 23 days.

(21) Appl. No.: 10/418,185

(22) Filed: Apr. 17, 2003

(65) Prior Publication Data
US 2004/0022608 A1 Feb. 5, 2004

Related U.S. Application Data

(63) Continuation-in-part of application No. 09/835,475, filed on Apr. 16, 2001, now Pat. No. 6,558,103.
(60) Provisional application No. 60/372,787, filed on Apr. 17, 2002.

(51) Int. Cl.[7] ............................................. B65G 65/00
(52) U.S. Cl. ....................... 414/420; 414/354; 414/414
(58) Field of Search ................................. 414/265, 354, 414/356, 368, 403, 414, 419, 420, 421, 574, 576

(56) References Cited

U.S. PATENT DOCUMENTS

| | | | | |
|---|---|---|---|---|
| 3,754,671 A | * | 8/1973 | Walda | 414/404 |
| 4,640,656 A | * | 2/1987 | Mattei | 414/303 |
| 4,670,227 A | * | 6/1987 | Smith | 422/297 |
| 5,427,492 A | * | 6/1995 | Tanaka et al. | 414/414 |
| 6,129,498 A | * | 10/2000 | Ulbrich | 414/420 |
| 6,595,736 B2 | * | 7/2003 | Lybarger | 414/421 |

* cited by examiner

Primary Examiner—Khoi H. Tran
Assistant Examiner—Michael Lowe
(74) Attorney, Agent, or Firm—Grossman, Tucker, Perreault & Pfleger, PLLC

(57) ABSTRACT

An apparatus for unloading packages, parcels, postal items, baggage, etc., from a container having an open side. The apparatus has a sliding wall that is disposed over the open side of the container when the container is receiving within the apparatus. The apparatus, along with the container, is tilted such that the open side of the container is generally directed downward. From this tilted orientation, the sliding wall of the apparatus is withdrawn, incrementally exposing the open side of the container, permitting the controlled egress of the packages, etc., from the container.

6 Claims, 8 Drawing Sheets

CONTAINER UNLOADING APPARATUS

CROSS-REFERENCE TO RELATED APPLICATIONS

The present application is a continuation in part of U.S. patent application Ser. No. 09/835,475, filed on Apr. 16, 2001; now U.S. Pat. No. 6,558,103 this application further claims the benefit of provisional patent application Ser. No. 60/372,787 filed on Apr. 17, 2002. The entire disclosures of both applications are herein incorporated by reference in their entirety.

FIELD OF THE INVENTION

The present invention pertains to an apparatus for unloading packages from a container.

BACKGROUND OF THE INVENTION

Traditionally, several methods have been employed for unloading and processing containers of parcels, packages, postal goods, etc. The most basic method involves manually unloading the containers one package at a time. However, this method is very time consuming and has a potential for producing repetitive motion injuries to the people involved in the process. These problems have lead to the advent of a variety of automated, and semi-automated processes.

In addition to manual unloading methods, there exist a number of automated and semi-automated systems for unloading containers. While the known systems vary according to the design of the container itself, the majority of such systems rely on simply dumping the contents from the container onto a conveyor, slide, or the like. However, such dumping systems are often troublesome when employed to empty containers having bar sides, internal shelves and internal brackets, wherein the contents of the container may hang-up on such features. Additionally, inversion dumping often leads to piling of the contents of the container, rather than spreading them in a smooth dispersion onto the conveyor. Furthermore, the tendency of the contents to pile requires that the mouth of the container be elevated above the conveyor a height sufficient to allow the resultant pile to clear the container. This characteristic of inversion dumping makes an already inherently harsh method even rougher on the packages being unloaded.

It would, therefore, be desirable to be able to unload-packages from an open front container in a manner that minimizes the probability of damage to the packages, and further releases the packages in a controlled manner in order to prevent piling.

SUMMARY OF THE INVENTION

According to the present invention, there is provided an apparatus for unloading containers, wherein the apparatus comprises a tilting carriage. The carriage is configured to receive the container in a manner such that a slidable wall of the carriage is disposed over an open side of the container, thereby fully enclosing the container. With the container in place in the carriage, the carriage is tilted such that the open side of the container is oriented downward, preferably toward a conveyor, slide, or the like. The slidable wall of the carriage is then displaced from the open side of the container, thereby incrementally opening the container. Consistent with the present invention, the container may be positioned in close proximity to a conveyor prior to releasing the contents of the container, therein minimizing damage to the packages resulting from being dropped. Furthermore, the incremental opening of the container provides for a more gradual release of the contents of the container, thereby reducing problems of piling of the contents on a conveyor, or the like.

BRIEF DESCRIPTION OF THE DRAWINGS

Exemplary embodiments of the invention are set forth in the following description and shown in the drawings, wherein.

DETAILED DESCRIPTION OF THE INVENTION

Figure 1:
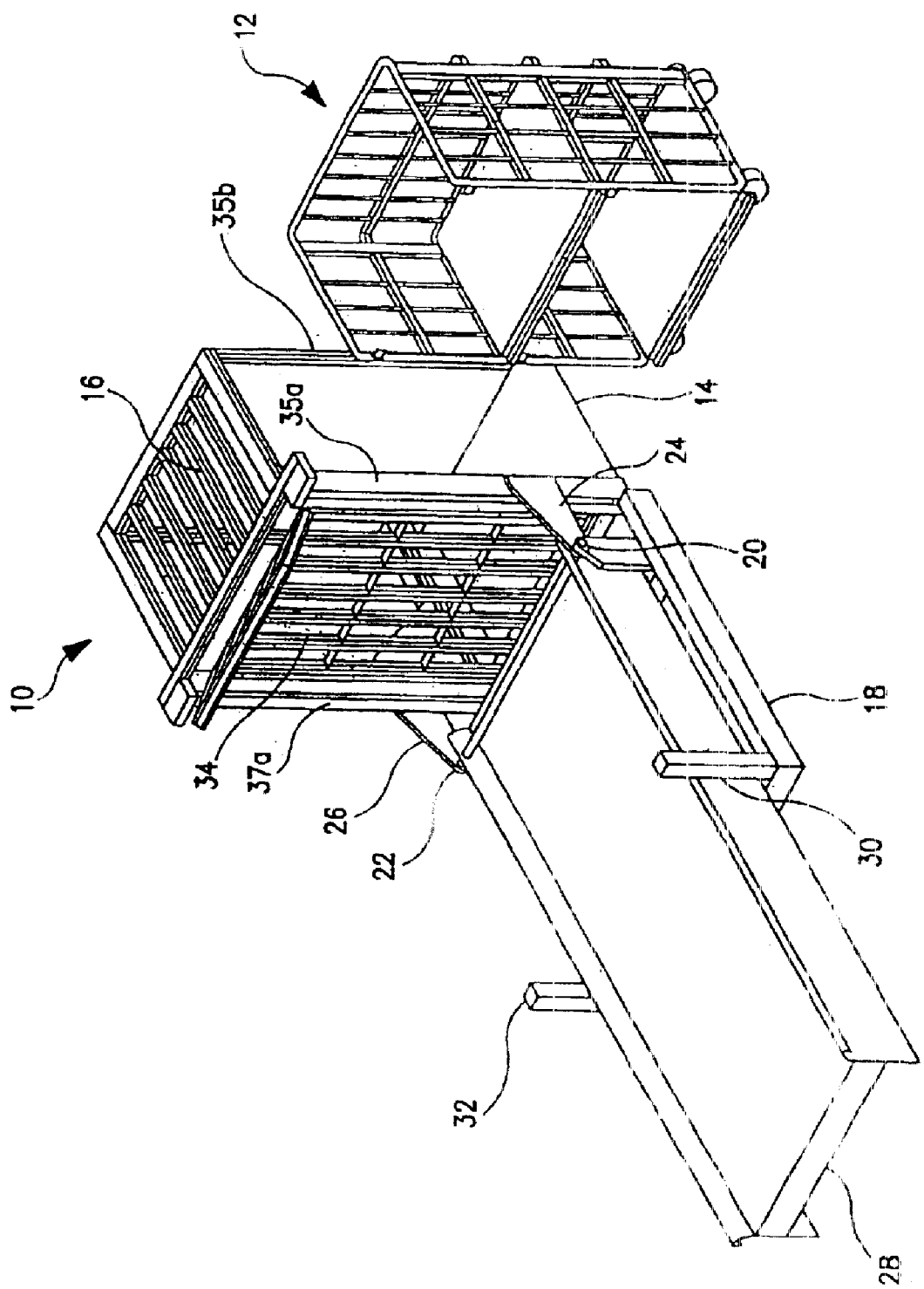
FIG. 1 is a perspective view of an exemplary apparatus consistent with the present invention prior to loading a container.

An apparatus consistent with the present invention may be used for unloading a variety of packages, parcels, postal items, baggage, etc., from containers having an open front side. Although the present invention is not limited thereto, it will be assumed for the purposes of this description that the containers to be unloaded are mobile, such as rolling containers. The unloading of parcels, etc., takes place by tilting the container so that it is open-side-down over an unloading zone, which may comprise a conveyor, a roller bed, a slide, etc., and further effecting a controlled release of the parcels, etc., from the container onto the unloading zone. For ease of understanding, the present invention will be described below in terms of an exemplary embodiment configured to unload postal items, such as parcels and envelopes, from a rolling container having an open front side and an open top side. It will, however, be readily appreciated by those skilled in the art that the principles of the present invention are susceptible for use in unloading any open front container in a controlled manner.

Referring to the drawings, an exemplary apparatus consistent with the present invention is illustrated. The apparatus comprises a carriage 10 configured to receive an open front container 12. The carriage comprises a floor member 14 for supporting the container 12, and a ceiling member 16 spaced from the floor member 14 to limit axial movement of the container 12 within the carriage. Furthermore, the ceiling member 16 is configured to prevent spillage of parcels from the container 12 in the event that the container 12 is of an open top design, as illustrated in the exemplary embodiment. Consistent with this requirement, the ceiling member 16 may range from a solid surface to a retaining arm. In the exemplary embodiment illustrated in FIGS. 1 and 2 the ceiling member 16 comprises bar grate sufficient to prevent the spillage of parcels having a minimum dimension greater than the separation of the bars. Similarly, consistent with the above stated requirements, the floor member 14 may range from a solid surface, as illustrated in the exemplary embodiment, to a pair of forks extending in the direction of loading of the container 12. The employment of these alternative configurations will become more apparent from the below description of the operation of an apparatus consistent with the present invention.

The carriage 10 is pivotally connected to a base frame 18 by pivots 20 and 22. Preferably, the carriage 10 is attached to the pivots 20 and 22 by pivot arms 24 and 26. Pivot arms 24 and 26 provide an increased degree of forward translation of the carriage 10 relative to the base frame 18 during tilting, therein placing a greater amount of the carriage 10, and therein a greater amount of the container 12, over the conveyor 28, which is preferably disposed in front of the carriage 10, when it is in an upright position, and between the frame members of the base frame 18. Additionally, it is advantageous to employ support posts 30 and 32 extending from the base frame 18, wherein the support posts 30 and 32 are configured to receive and support the carriage 10 when it is in a tilted position, as illustrated in FIGS. 2 and 3, enhancing the stability thereof.

The apparatus of the present invention further comprises a front wall 34 that is slidable along the axis of the carriage 10. The front wall 34 is configured to be disposed proximate the front of a container 12 when the container is loaded in the carriage 10. The presence of the front wall 34 effectively provides for full enclosure of the container 12 once it has been loaded into the carriage 10. As with the ceiling member 16, the construction of the front wall 34 is dictated by the size of the packages to be carried by the container 12. As illustrated in FIGS. 1 through 3, when larger packages are anticipated, the carriage 10 may be configured with a bar or slat front wall 34, wherein the separation between bars is less than the minimum dimension of the packages. When smaller packages are anticipated, the front wall 34 may comprise a grate or solid surface, therein preventing spillage of the contents of the container 12. As best shown in FIG. 1, preferably the top edge of the front wall 34, as viewed when the carriage 10 is in an upright position, is angled away from the carriage 10 so that the terminal edge of the front wall 34 lies in close proximity to the conveyor 28 when the carriage 10 is in a tilted position.

Figure 2:
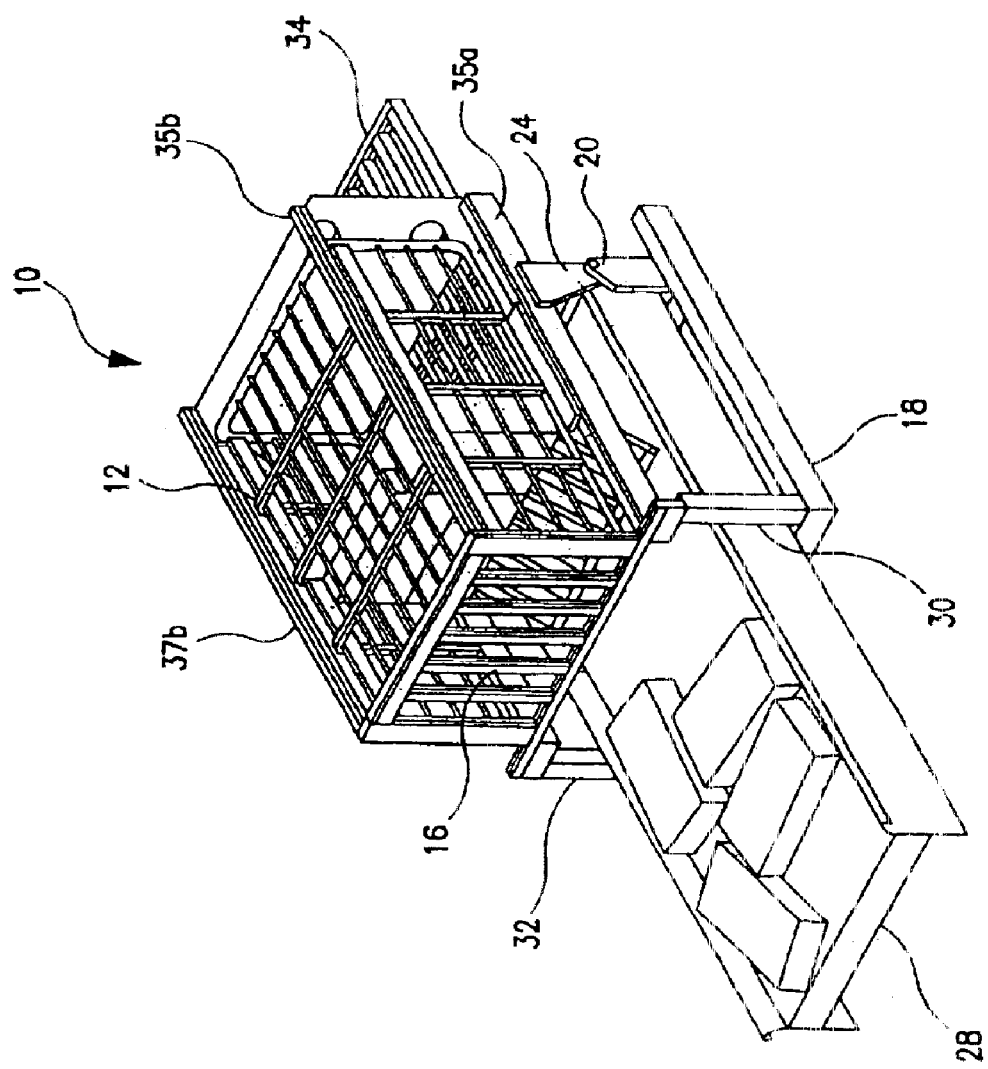
FIG. 2 is a perspective view of an exemplary apparatus consistent with the present invention during the unloading phase.
Figure 3:
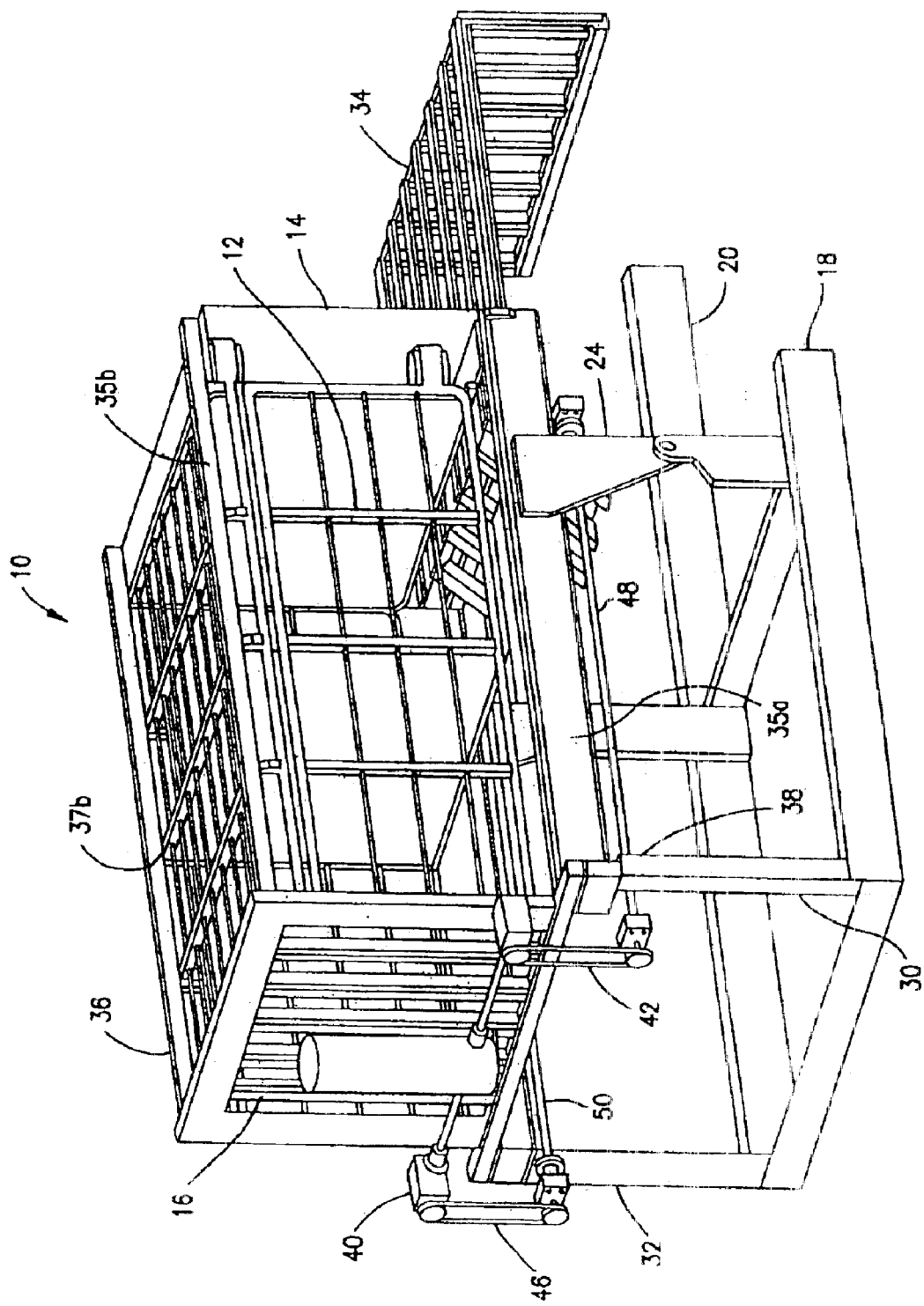
FIG. 3 is a perspective view of an exemplary unloading apparatus consistent with the present invention.

As shown in FIGS. 1 through 3, the carriage 10 further comprises vertical frame components 35a and 35b as well as 37a and 37b. The vertical frame components 35a, 35b, 37a, and 37b may be employed to provide the necessary structural integrity of the carriage 10. Consistent with, and similar to, the above discussed requirements of the floor member 14 and the ceiling member 16, the vertical members 35a, 35b, 37a, and 37b may be present simply as vertically oriented beams, as illustrated in the exemplary embodiment, sufficient to maintain the proper separation of the floor member 14 and the ceiling member 16, and to maintain the integrity of the carriage 10. Additionally, the vertical members 35a, 35b, 37a, and 37b must be configured to permit the ingress and egress of the container 12. However, the form and the structure of the vertical members 35a, 35b, 37a, and 37b may be varied within these requirements from a plurality of vertical members to a plurality of solid surfaces.

In operation, the container 12 may be loaded into the carriage 10 either from the side of the carriage 10, as shown in the illustrated exemplary embodiment, or alternately may be loaded into the carriage 10 from the rear. The carriage 10, having the container 12 received therein, is then tilted to a substantially horizontal position about pivots 20 and 22, and is supported in the horizontal position by support posts 30 and 32. As previously noted, the carriage 10 may be pivotally connected to the base frame 18 by way of pivot arms 24 and 26, therein providing a greater forward displacement of the carriage 10, and the container 12 therein, relative to the base frame 18 and the conveyor 28. When the carriage 10 and the container 12 therein, are in the tilted position, the contents of the open front container 12 will be resting on the inside of the front wall 34.

The tilting action of the carriage 10 may be achieved either manually, or in an automated or semi-automated manner. In a preferred embodiment consistent with the present invention, the carriage 10 is tilted by a hydraulic or pneumatic actuator, such as a piston disposed between the carriage 10 and the base frame 18. Alternate automated means for tilting the carriage may include an electric motor acting at one, or both, of the pivots 20 and 22. Additional methods of achieving a tilting action of the carriage 10 will be readily apparent to those having skill in the art.

After the carriage 10 has been moved to a generally horizontal position, the container 12 may be unloaded, as onto a conveyor 28 as illustrated in FIG. 2. The container 12 is unloaded by sliding the front wall 34 along the axis of the carriage 10 in the direction of the floor member 14, i.e., rearward. The rearward displacement of the front wall 34 provides an enlarging opening in the front of the carriage 10 allowing egress of parcels from the container. This growing opening will allow the contents of the container 12 to shingle out, i.e., exit the container in a dispersed manner, wherein the parcels that were at the top of the container 12, before it was tilted, will be allowed to exit the container 12 first, when the front wall has undergone a minimal of displacement. It will be appreciated at this point that, in order to undergo the unloading operation, the container 12 must be retained within the carriage 10 when the front wall 34 is in an open position. This may easily be accomplished by providing front vertical members 35a and 37a horizontally spaced from one another a distance less than the width of the container 12, therein preventing the forward egress of the container 12. Alternately, the carriage 10 may be provided with detents or other retention features similarly preventing the forward egress of the container 12 when the carriage 10 is in a tilted position, and the front wall 34 is in an open position.

The sliding action of the front wall 34 may be effected by a variety of mechanical or manual means. In the exemplary embodiment illustrated in FIG. 3, the front wall 34 is actuated by a worm drive mechanism comprising a centrally mounted motor 36 working through a system of gear boxes 38 and 40 and belts 42 and 46 to drive a worm shaft 48 and 50 on either side of the carriage 10. The worm shaft 48 acts in conjunction with drive feature 50 to effect the translation of the front wall 34 along the worm shaft 48. It will be appreciated by those skilled in the art, however, that there are a multitude of alternate ways to accomplish the sliding action of the front wall, including, but not limited to, direct belt or chain drive, linear hydraulic or pneumatic actuators, etc.

Discharging the parcels from the exemplary apparatus in the above-described manner makes it less likely that the contents of the container 12 will become caught in side of the container 12. Furthermore, the gradual release of the parcels from the container 12, a product of the sliding front wall 34, will allow the parcels to be discharged in a metered or single layer, rather than in a pile or clump, therein allowing easier secondary process handling. Finally, the angled nature of the top of the front wall 34 provides a chute between the interior of the container 12 and the conveyor 28, therein allowing a much more gentle discharge of the contents than simply dumping the parcels out. This characteristic has the result of causing less damage to the parcels during processing.

Figure 4:
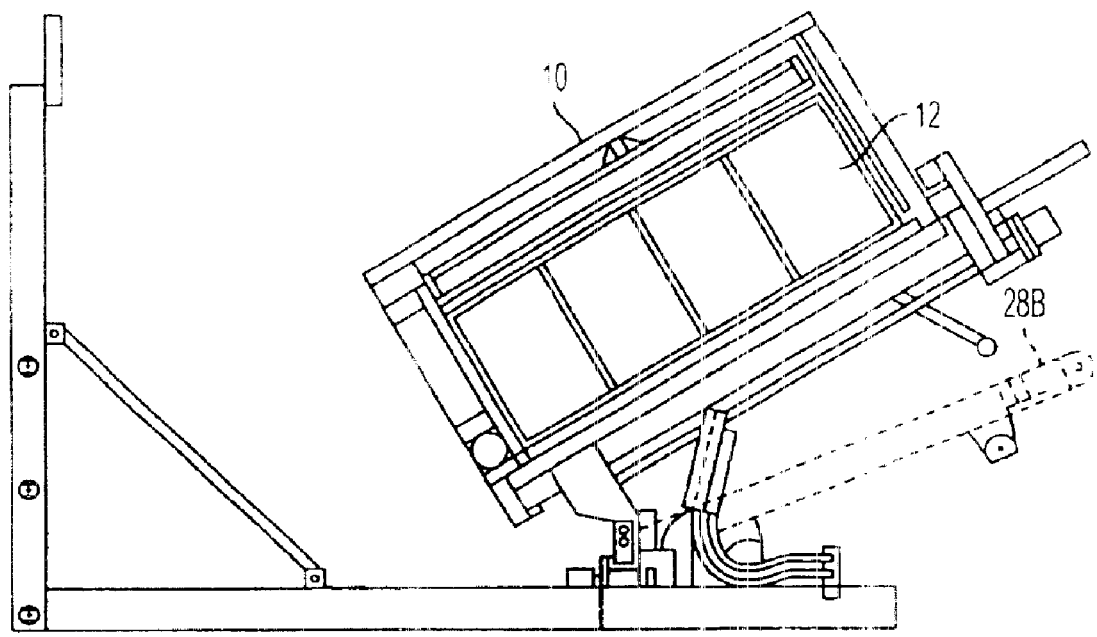
FIG. 4 is a side elevation of an exemplary unloading apparatus consistent with another embodiment of the present invention.

In the embodiment illustrated in FIGS. 2 and 3, the carriage 10, and the container 12 are shown tilted to a generally horizontal position that is also generally parallel to the conveyor 28. Referring to FIG. 4 an alternative embodiment of the unloading apparatus is illustrated in which the carriage 10 may be adapted for positioning at tilt angles other than horizontal. For example, it may be desirable to tilt the carriage 10 only to an angle of 30 degrees relative to the horizontal. The tilt angle must be sufficient to allow the contents of the container 12 to slide out of the container 12. However, by utilizing a shallower tilt angle the contents of the container 12 may gently slide from the container in a controlled manner rather than dropping or tumbling on to the conveyor 28.

In FIG. 4 the conveyor 28b also illustrated oriented on an incline. Positioning the conveyor 28b on an incline also has the effect of facilitating a less harsh delivery of the contents of the container 12 to the conveyor 28b. In the illustrated embodiment, the carriage 10 and the conveyor 28b are illustrated in a relatively shallow tilt angle and inclined configuration. When these aspects of the invention are used in conjunction with each other not only is a more gentle delivery of the contents of the container 12 possible, but it may also allow the contents of the container 12 to be delivered to the conveyor 28b right-side up. Unloading the contents of the container 12 oriented right-side up may enable a greater degree of automation of up-stream processing.

In the illustrated exemplary embodiment, the angle of incline of the conveyor 28b and the tilt angle of the carriage 10 are such that the front of the conveyor 28b and carriage 10 are slightly out of parallel. It should be appreciated that when the conveyor 28b and carriage 10 are not parallel, the spacing between the carriage 10 and conveyor 28b will not be uniform. This situation may advantageously be used to accommodate differing size parcels etc. on different levels of the container 12.

While the exemplary embodiment of FIG. 4 illustrates the carriage 10 in a nonparallel tilt angle and the conveyor 28b at an incline, it should be understood that these are distinct aspects of the invention. According, while these aspects may advantageously be combined, the invention is not limited to such combination. Accordingly, the invention herein contemplates the use of a carriage tilt angle other than horizontal with a horizontal conveyor 28b as well as a horizontal carriage tilt angle with an inclined conveyor 28b, and combination and variations thereof. The combinations and variations of tilt angles and conveyor inclines may be modified according to specific applications and/or dictated by the size, shape, and type of the contents being unloaded from the container 12, as well as the required care in unloading the contents.

The tilt angle of the carriage 10 as well as the incline angle of the conveyor 28b may be variable such that a single apparatus may be configured to provide different tilt angles and/or inclines, therein making a single apparatus suitable for numerous circumstances. Variable tilt angle and/or incline may be provided using hydraulic, pneumatic, motor driven actuators. Because the carriage 10 may already include such actuators for tilting the carriage 10 from an initial upright position to a tilted position, the carriage may readily be adapted to alternative tilt angles. Another approach to achieving the alternative tilt angle and/or incline may include the use of support posts, such as 30 and 32 illustrated in FIGS. 1 through 3. The heights of such posts may be altered to adjust the resultant angle.

As described above, the top edge of the front wall 34 is preferably angled away from the carriage 10, thereby providing a chute between the container 12 and the conveyor 28. Desirably the chute extends to a position of close proximity with the conveyor 28. The chute, therefore, provides a less jarring or severe delivery of the contents of the container 12 to the conveyor 28. While the chute may be a fixed structure having a fixed delivery angle, this configuration may not provide optimum adaptability of the unloading apparatus.

Figure 5:
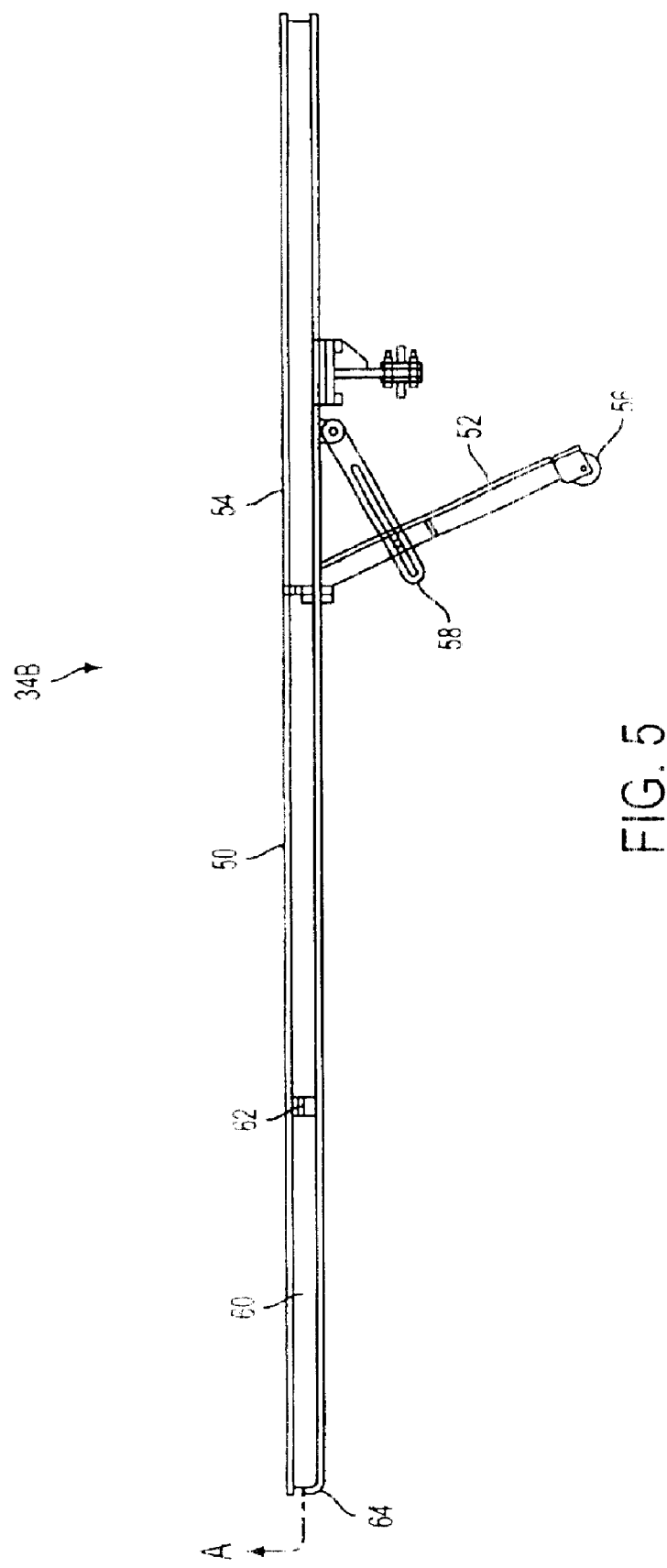
FIG. 5 is a side view of another exemplary embodiment of a front wall of an unloading apparatus consistent with the present invention.

Referring to FIG. 5 a front wall 34b consistent with another aspect of the preset invention is illustrated. The exemplary front wall 34b includes a gate portion 50 and a chute 52. The chute 52 is pivotally attached to the gate portion 50 generally at 54. The pivotal attachment may include any manner of hinge or pivot known by those having skill in the art. The pivotally attached chute 52 may accordingly achieve a variety of angular departures from the gate portion 50 allowing the characteristics of the unloading apparatus to be adjusted to different applications.

Consistent with one embodiment, the pivotal attachment 54 of the chute 52 may include a live hinge type of attachment, wherein the chute is free to continually alter the angle of departure from the gate portion 50. The ability to continually alter the angle of departure may allow the chute 52 to travel over segments or dividers that may be provided on a conveyor. Because the chute 52 is free to continually adjust its angle, it may be desirable to provide the distal end with wheels, rollers, or a bearing surface 56 that may ride on the conveyor, etc. It may additionally be desirable to provide supports 58 for the chute, which may be configured to accommodate the varying angles of the chute 52.

According to another embodiment, the chute 52 may have a controllably variable angle of departure from the gate portion 50. While the angle of the chute 52 is not freely and continuously variable, the angle of the chute may be set to predetermined angles to provide for different configurations and/or applications of the unloading apparatus. The angle of the chute 52 may be controlled by frictional interaction, such as a tightening a bolt, or through the inclusion of detent. In either case, the angular control may advantageously be implemented at either the pivot 54 or the support 58. Still alternatively, the angle of the chute 52 may be controlled using an actuator, such as a hydraulic, pneumatic, electromechanical etc. Various other control mechanism and implementations thereof will be apparent to those having skill in the art.

Still referring to FIG. 5, as a further optional aspect the front wall 34b may include at least one hinged panel 60. The hinged panel 60 may be attached by pivot 62, which may allow the panel 60 to pivot in the direction A. This feature may reduce the clearance necessary for the front wall 34b when unloading the container 12. For example, if the carriage 10 is tilted less than horizontal, as illustrated in the embodiment of FIG. 4, as the front wall 34b slides to release the contents of the container 12 the front wall 34b may contact the floor, or bottom support of the apparatus, prior to releasing all of the contents of the container 12. The pivot 62 may allow the hinged panel 60 to pivot away from the floor, thereby extending available travel of the front wall 34b. During further extension of the front wall 34b, the hinged panel 60 may slide along the floor rather than driving against it. The pivoting and the sliding action of the hinged panel 60 may be improved by incorporating a bearing surface 64, a wheel, or similar component on the corner of the panel 60 that will contact the floor.

Figure 6:
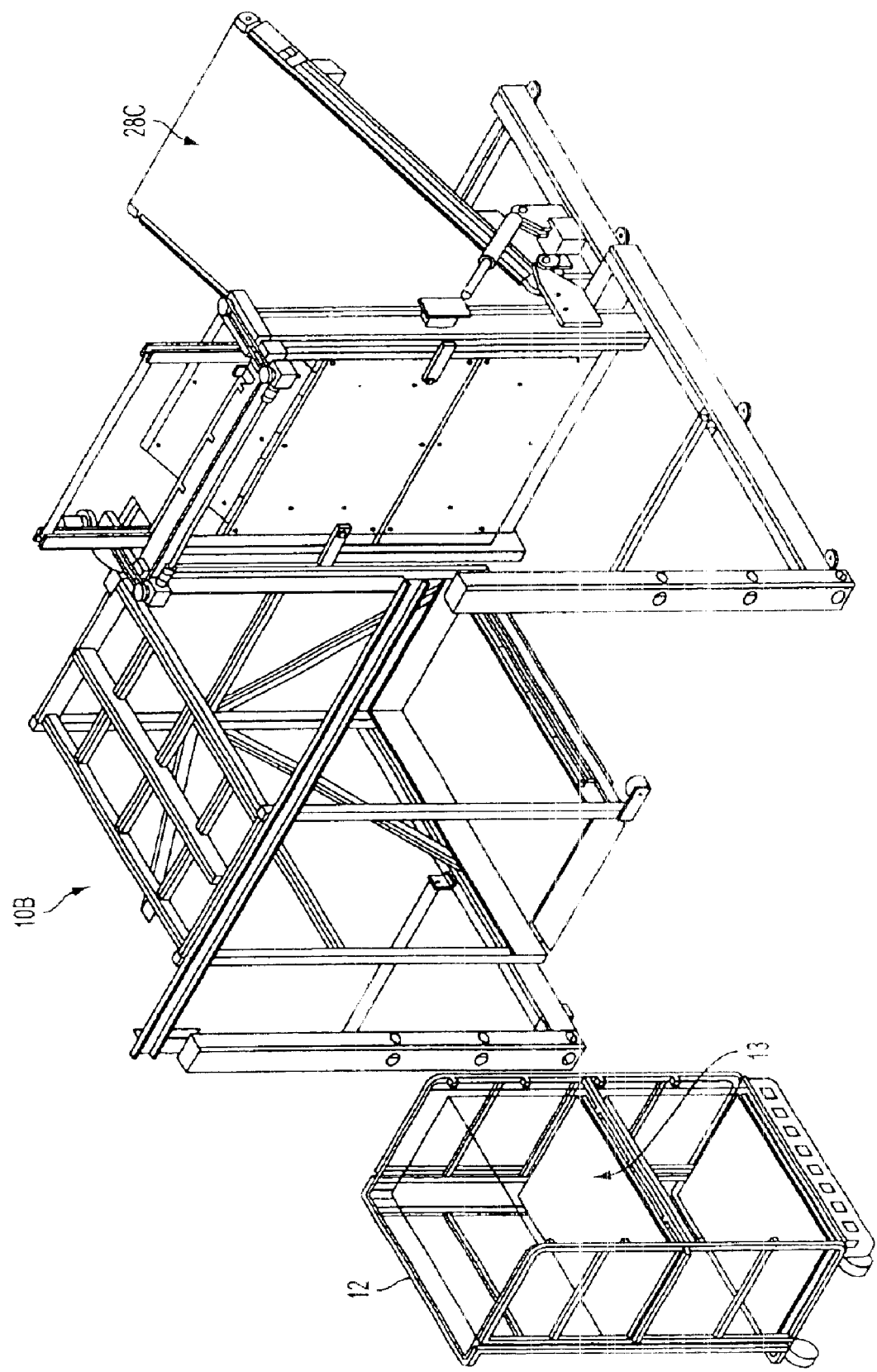
FIGS. 6 through 8 illustrate an embodiment of the invention providing an alternative loading mechanism.
Figure 7:
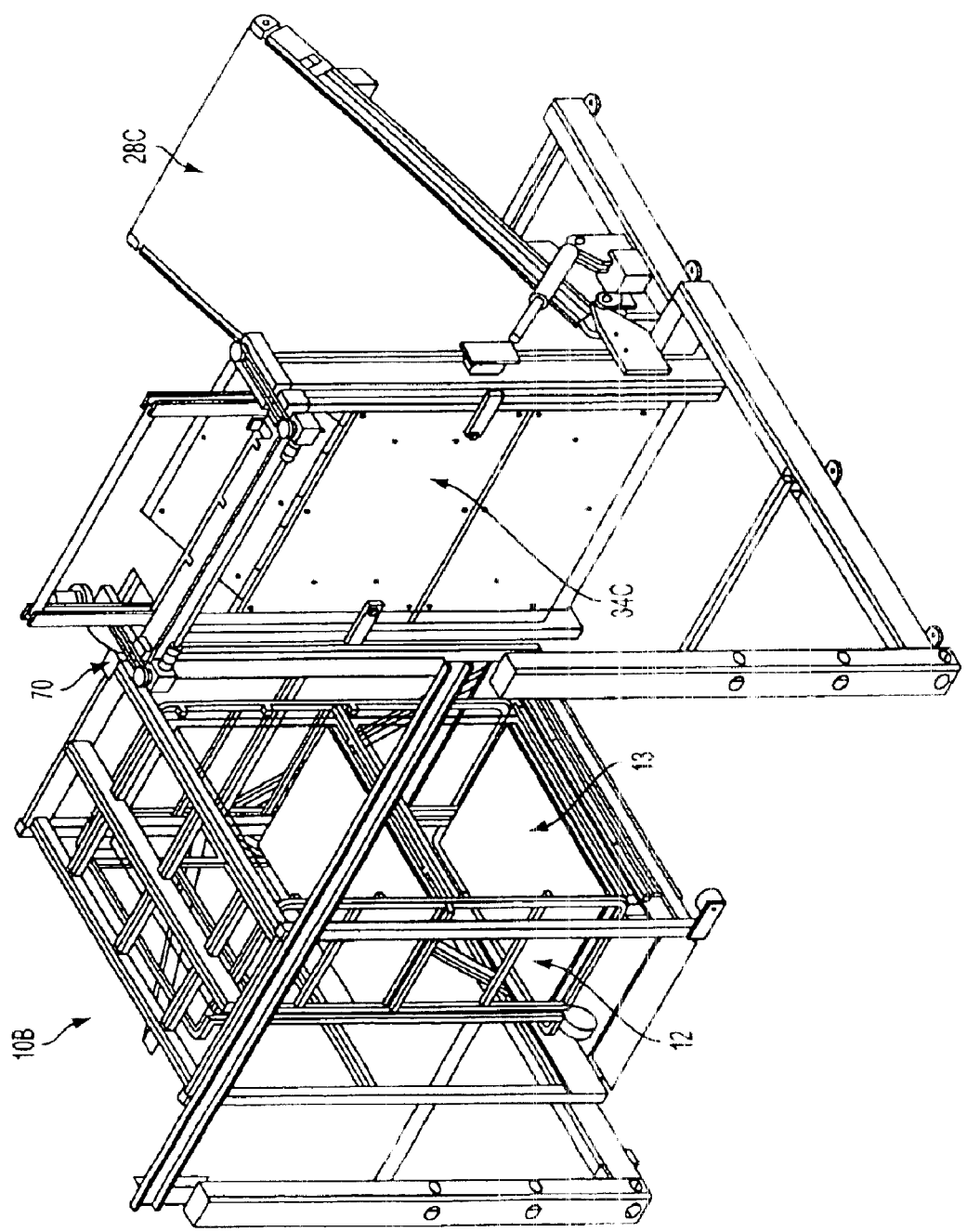
Figure 8:
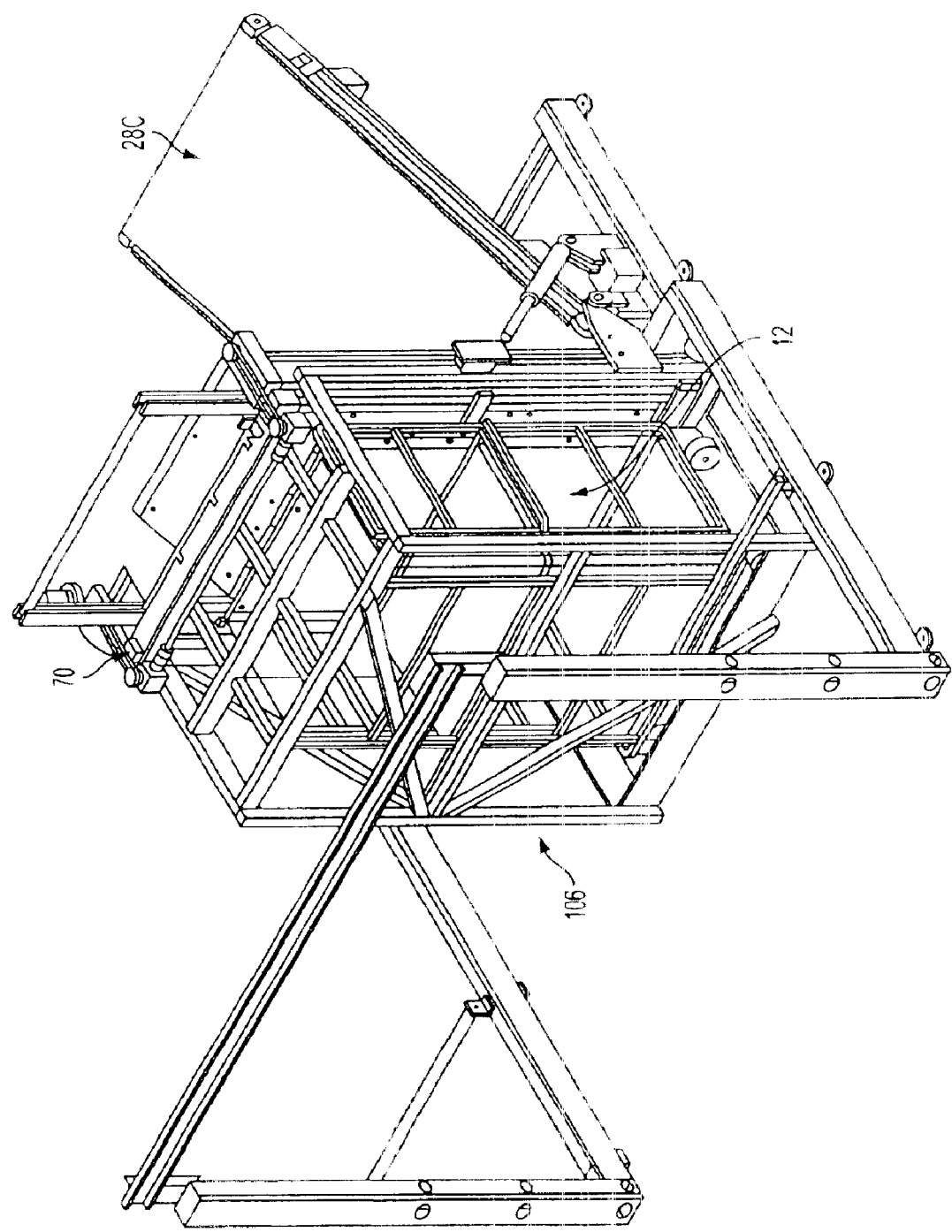

Turning to FIGS. 6 through 8 an embodiment of the apparatus herein is illustrated having an alternative loading mechanism. According to this mechanism, the container 12 is not provided to the carriage 10b with the open side of the container 13 oriented to and aligned with the conveyor 28c. In the illustrated exemplary embodiment, when the carriage 10b is empty and in condition to receive a container 12, the carriage may be offset from the conveyor 28c.

As depicted in FIG. 7, the container 12 may be inserted into the carriage 10b with the open side of the container 13 facing the side of the conveyor 28c. In the illustrated apparatus, the carriage 10b may be pivotally connected 70 to the unloading apparatus about a vertical axis. As can also be seen, the front wall 34c may not be attached to the carriage 10b, but may rather be disposed in front of the conveyor 28c.

Referring to FIG. 8, the carriage 10c having the container 12 therein may be rotated about pivot 70 such that the open side of the container 13 (not visible in the figure) is adjacent the front wall 34c. The container 12 may then be unloaded in the previously described manner in which the carriage 10c and container 12 are tilted over the conveyor 28c and the front wall 34c is retracted progressively exposing the open side of the container 13 to the conveyor 28c.

Consistent with the described embodiment the container 12 may be rotated, allowing the container 12 to be inserted in to the apparatus in an orientation other than required for final unloading. Additionally, the mechanism shifts the container 12 sideways, allowing the container 12 to be loaded from a location that is laterally displaced from the conveyor 28c.

It should be understood that there are other alternative mechanisms which may accomplish the same general objective of allowing the container to be loaded into the apparatus at a location that is not readily conducive to unloading onto a conveyor, from which location the container may be transported to the conveyor and oriented in the manner required for unloading. Such mechanisms may include tracks and/or translating mechanisms, in addition to rotational mechanism. Such variations and modification will be readily understood by those having skill in the art.

It will be appreciated that the exemplary embodiment described and depicted in the accompanying drawings herein is for illustrative purposes only, and should not be interpreted as a limitation. It is obvious that many other embodiments, which will be readily apparent to those skilled in the art, may be made without departing materially from the spirit and scope of the invention as defined in the appended claims.

What is claimed is:

1. An apparatus for unloading a container having at least one open side, the apparatus comprising:

a carriage mounted to a base frame, said carriage configured to receive said container, and said carriage comprising a wall portion for positioning adjacent to said open side of said container, wherein said carriage is configured to rotate relative to said base frame positioning said open side of said container at a predetermined tilt angle;

said wall portion being configured to slide relative to said open side of said container to provide progressive access to said container, wherein said wall includes a chute portion adjacent a first end of said wall, said chute portion being outwardly angled from said wall.

2. The apparatus according to claim 1 wherein said chute portion is pivotally attached to said wall.

3. The apparatus according to claim 2 wherein said outward angle of said chute portion in freely variable.

4. The apparatus according to claim 2 wherein said chute portion may be set to a predetermined outward angle from said wall.

5. An apparatus for unloading a container having at least one open side, the apparatus comprising:

a carriage mounted to a base frame, said carriage configured to receive said container, and said carriage comprising a wall portion for positioning adjacent to said open side of said container, wherein said carriage is configured to rotate relative to said base frame positioning said open side of said container at a predetermined tilt angle;

said wall portion being configured to slide relative to open side of said container to provide progressive access to said container, wherein a second end of said wall includes a hinge panel pivotally attached to said wall, said hinge panel configured to deflect away from said wall.

6. An apparatus for unloading a container having at least one open side, the apparatus comprising:

a carriage mounted to a base frame, said carriage configured to receive said container, and said carriage comprising a wall portion for positioning adjacent to said open side of said container, wherein said carriage is configured to rotate relative to said base frame positioning said open side of said container at a predetermined tilt angle;

said wall portion being configured to slide relative to said open side of said container to provide progressive access to said container, wherein said carriage is configured to move between a first position for receiving said container and a second position for tilting said container, and wherein said carriage is configured to rotate about a vertical axis relative to said base frame between said first position and said second position, whereby said carriage is configured to reorient said open side of said container from a direction orthogonal to a conveyor to a direction aligned with said conveyor.

* * * * *